Nov. 27, 1945.   T. I. RESS   2,389,932
VARIABLE SPEED GOVERNOR FOR MOTION PICTURE CAMERAS
Filed Feb. 7, 1944
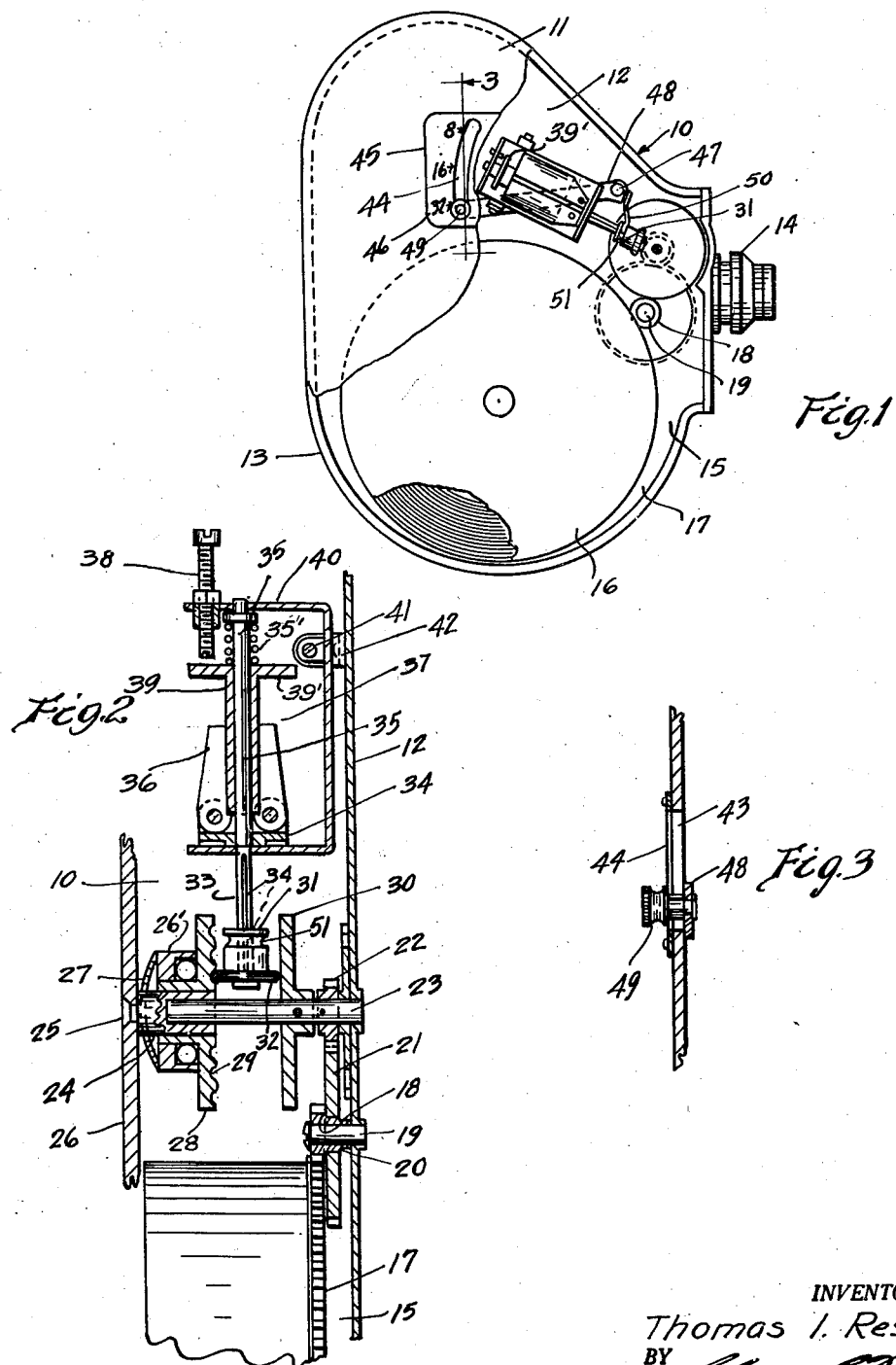
INVENTOR.
Thomas I. Ress
BY
His Attorney Patented Nov. 27, 1945

2,389,932

UNITED STATES PATENT OFFICE 2,389,932

VARIABLE-SPEED GOVERNOR FOR MOTION-PICTURE CAMERAS

Thomas I. Ress, Chicago, Ill., assignor to De Vry Corporation, Chicago, Ill., a corporation of Illinois Application February 7, 1944, Serial No. 521,341

1 Claim. (Cl. 188—187)

This invention relates to certain new and useful improvements in motion picture cameras, and more specifically to a variable speed governor therefor and has among its principal objects the provision of an improved structure of this character which will be highly efficient in use and economical in manufacture.

In most motion picture cameras there is employed a spring motor of a well-known type and design. This motor, for picture precision, should during operation run at a uniform speed, otherwise the results will be unsatisfactory picture photography. It is therefore one of the principal objects of this invention to provide in such a camera provisions for controlling and adjusting the speed of the spring motor by means of a single speed governor which is variable in adjustment to bring about the desired speed for best photography.

A still further object of the invention is the provision of means for preventing the spring motor from running wild.

Another object of the invention is the provision for manually adjusting the governor from the exterior of the camera housing.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a side view of a camera with parts broken away, showing my improved variable speed control;

Fig. 2 is an enlarged fragmentary sectional view of the variable speed control embodied in my invention; and Fig. 3 is a fragmentary detail view taken substantially on line 3—3 of Fig. 1.

Many forms of construction may be provided for accomplishing the various objects of my invention. The drawing (Figs. 1 to 3 inclusive) illustrates my preferred form of construction. In this connection a camera is indicated generally at 10 and comprises side walls 11 and 12 and walls 13. This camera further includes a lens structure 14 of a well-known form and construction. This lens structure does not constitute any part of the present invention.

Arranged within the housing 15 provided by the walls 11, 12 and 13 is a spring motor 16. This motor 16 is of a well-known construction used in cameras of the type shown for driving the film.

Associated with this motor 16 is a ring gear 17 meshing with a pinion 18 mounted on a shaft 19. On the hub 20 of the pinion 18 is fixed an intermediate gear 21. This gear 21 meshes with a pinion 22 fixed to a shaft 23. One end of this shaft 23 is journalled in the wall 12 while the opposite end of the shaft is journalled in a suitable bearing 24 carried as at 25 by a partition 26.

A thrust washer 27 is mounted on the bearing 25 and bears against a roller bearing 26' which in turn bears against a disc 28 having free rotation on the bearing 24. This disc 28 is provided on one face with a plurality of spaced circular grooves 29.

Fixed to the shaft 23 is a friction disc 30. This disc 30 is spaced from the grooved disc 28. Between these discs 28 and 30 is a friction wheel 31 having a flange 32 thereof adapted to engage in the groove 29 and also bear against the face of the friction drive disc 30.

This friction wheel is slidable longitudinally upon a stud 33 and has connection therewith by means of rib and groove connection 34 whereby the friction wheel may be moved longitudinally on the stud but must rotate therewith.

This stud is formed as a part of a shaft 35 of the governor 36 of a well-known construction including the balance weights 37 and an adjustable screw 38 the latter serving as a brake in its engagement with an adjacent brake disc formed as an integral part of the governor sleeve 39, as best shown in Fig. 2.

The brake disc is shown at 39' and operates against a spring 35' serving to resist the movement of the sleeve 39 by action of the weights 36 and 37.

This governor may be of any well-known construction and includes a frame 40 pivotally supported upon pintle 41 carried by bracket 42 secured to the wall 12.

To complete the invention I provide in the wall 11 an elongated opening 43. Secured to the wall 11 and having an opening 44 registering with the opening 43 is an escutcheon plate 45 having indicia 46 thereon to indicate the speed of rotation of the spring motor.

Pivoted to the wall 12 as at 47 is an arm 48. One end of this arm 48 carries a clamping screw 49 by which the arm 48 may be secured in an adjusted position with respect to the plate 45. The other end of the arm 48 is provided with a yoke 50 which engages in a groove 51 provided by the friction wheel 31. The arrangement is such that by loosening the clamping screw 49 the arm 48 may be adjusted to change the position of the friction wheel 31 with respect to the grooved disc 28 and the face of the friction drive wheel 30.

Should the friction wheel be adjusted in the groove nearest the axis of the shaft 23 it is clear that the speed of rotation of the governor shaft 35 will be faster than would be its speed were the friction wheel 32 adjusted in the outermost of the grooves 29, with the result that the speed of rotation of the governor will be proportionately increased over the speed of the spring motor, resulting in quicker movement of the governor sleeve 39 to bear the brake disc thereof against the brake screw 38. In this manner a uniform speed is maintained and may be varied at the will of the operator to meet changing conditions during the act of photographing.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

Means for controlling the speed of a spring motor of a motion picture camera comprising a supporting structure, a shaft rotatably carried by said structure, means operatively connecting said shaft to said spring motor, opposed discs on said shaft, one of said discs being freely rotatable with respect to said shaft and provided with a plurality of facial grooves, means fixedly securing the other of said discs to said shaft for rotation therewith, a friction wheel disposed between said discs and frictionally engaging the face of the disc fixed to said shaft and adapted to selectively engage the grooves of the freely rotatable disc, a governor, said governor including a governor shaft carrying said friction wheel and having means to permit said wheel to be moved longitudinally with respect thereto, a spring-controlled governor sleeve on said governor shaft and having a brake disc, and a brake screw adapted to be engaged by said disc, in combination with means for moving said friction wheel relative to said governor shaft.

THOMAS I. RESS.